US012600611B2

(12) United States Patent
Puszkiewicz et al.

(10) Patent No.: US 12,600,611 B2

(45) Date of Patent: Apr. 14, 2026

(54) OPTO-ELECTRIC SYSTEM OF ENHANCED OPERATOR CONTROL STATION PROTECTION

(71) Applicant: JLG Industries, Inc., McConnellsburg, PA (US)

(72) Inventors: Ignacy Puszkiewicz, Hagerstown, MD (US); Matthew I. Gilbride, Frederick, MD (US); David W. Lombardo, Walkersville, MD (US); Brian K. Mohlman, Broad Top, PA (US)

(73) Assignee: JLG Industries, Inc., McConnellsburg, PA (US)

( * ) Notice: Subject to any disclaimer, the term of this patent is extended or adjusted under 35 U.S.C. 154(b) by 0 days.

(21) Appl. No.: 18/206,728

(22) Filed: Jun. 7, 2023

(65) Prior Publication Data

US 2023/0312317 A1 Oct. 5, 2023

Related U.S. Application Data

(63) Continuation of application No. 16/189,021, filed on Nov. 13, 2018, now Pat. No. 11,708,254, which is a continuation of application No. 15/094,286, filed on Apr. 8, 2016, now Pat. No. 10,124,999, which is a continuation-in-part of application No. 13/885,720, filed as application No. PCT/US2011/066122 on Dec. 20, 2011, now Pat. No. 9,586,799.

(60) Provisional application No. 61/435,558, filed on Jan. 24, 2011, provisional application No. 61/424,888, filed on Dec. 20, 2010.

(51) Int. Cl.

*B66F 17/00* (2006.01)
*B66F 11/04* (2006.01)

(52) U.S. Cl.

CPC .......... *B66F 17/006* (2013.01); *B66F 11/044* (2013.01)

(58) Field of Classification Search

CPC ....... B66F 11/04; B66F 11/042; B66F 11/044; B66F 11/046; B66F 17/006

See application file for complete search history.

(56) References Cited

U.S. PATENT DOCUMENTS 4,754,840 A 7/1988 MacDonald
4,917,213 A 4/1990 Kessler
4,942,529 A 7/1990 Avitan (Continued)

FOREIGN PATENT DOCUMENTS

CN 2934193 Y 8/2007
CN 201665512 12/2010

(Continued)

OTHER PUBLICATIONS

Japanese Office Action dated May 18, 2021 issued in Japanese Patent Application No. 2018-179788 and English translation, 26 pp.

(Continued)

*Primary Examiner* — Colleen M Chavchavadze

(74) *Attorney, Agent, or Firm* — FOLEY & LARDNER LLP

(57) ABSTRACT

A system for protecting an operator on an aerial work platform from a crushing hazard includes a sensor, such as opto-electric sensor, positionable adjacent the control panel area. A control system is programmed to control operation of the driving components based on signals from the sensor.

17 Claims, 14 Drawing Sheets

(56) References Cited

U.S. PATENT DOCUMENTS

| | | | | |
|---|---|---|---|---|
| 4,979,588 | A | 12/1990 | Pike | |
| 5,021,917 | A * | 6/1991 | Pike | B66F 11/046 182/2.11 |
| 5,740,887 | A | 4/1998 | Unger | |
| 5,992,562 | A | 11/1999 | Boeckman | |
| 5,992,572 | A | 11/1999 | Gilliland | |
| 6,065,565 | A | 5/2000 | Puszkiewicz | |
| 6,595,330 | B1 | 7/2003 | Henrickson et al. | |
| 6,823,964 | B2 | 11/2004 | Goode | |
| 6,842,684 | B1 | 1/2005 | Kade | |
| 6,880,187 | B1 | 4/2005 | Johnson | |
| 7,194,358 | B2 * | 3/2007 | Callaghan | B66F 17/006 340/436 |
| 7,397,351 | B1 | 7/2008 | Rubin | |
| 8,016,074 | B2 | 9/2011 | Black | |
| 8,490,746 | B2 * | 7/2013 | Cummings | B66F 17/006 182/2.1 |
| 8,813,910 | B2 | 8/2014 | Bowden | |
| 9,022,160 | B2 | 5/2015 | Smith | |
| 9,243,412 | B1 | 1/2016 | Gallette | |
| 9,522,817 | B2 | 12/2016 | Castaneda | |
| 9,586,799 | B2 | 3/2017 | Hao | |
| 9,676,602 | B2 | 6/2017 | Cummings | |
| 9,776,847 | B2 | 10/2017 | Mondal | |
| 9,783,086 | B2 | 10/2017 | Parker | |
| 9,862,582 | B2 | 1/2018 | Cummings et al. | |
| 10,029,899 | B2 | 7/2018 | Hao | |
| 10,618,786 | B2 | 4/2020 | Parot | |
| 10,926,986 | B2 * | 2/2021 | Parot | B66F 17/006 |
| 2003/0172598 | A1 | 9/2003 | Greer | |
| 2004/0173404 | A1 | 9/2004 | Kobel | |
| 2005/0187712 | A1 | 8/2005 | Callaghan | |
| 2005/0224439 | A1 | 10/2005 | Bean | |
| 2007/0154063 | A1 | 7/2007 | Breed | |
| 2008/0142713 | A1 | 6/2008 | Breed | |
| 2008/0144944 | A1 | 6/2008 | Breed | |
| 2008/0262682 | A1 | 10/2008 | Bergsten | |
| 2009/0260920 | A1 | 10/2009 | Cummings | |
| 2010/0068018 | A1 | 3/2010 | Maguin | |
| 2010/0114405 | A1 | 5/2010 | Elston | |
| 2010/0133043 | A1 | 6/2010 | Black | |
| 2010/0200332 | A1 | 8/2010 | Bowden | |
| 2010/0219018 | A1 | 9/2010 | Knaak | |
| 2010/0289662 | A1 | 11/2010 | Dasilva | |
| 2011/0046813 | A1 | 2/2011 | Castaneda | |
| 2011/0166721 | A1 | 7/2011 | Castaneda | |
| 2011/0286007 | A1 | 11/2011 | Pangrazio | |
| 2012/0078471 | A1 | 3/2012 | Siefring | |
| 2012/0152653 | A1 | 6/2012 | Bowden | |
| 2012/0211301 | A1 | 8/2012 | Clark | |
| 2012/0318610 | A1 | 12/2012 | Cummings | |
| 2013/0153333 | A1 | 6/2013 | Richards | |
| 2013/0197760 | A1 | 8/2013 | Castaneda | |
| 2013/0233645 | A1 | 9/2013 | Hao | |
| 2013/0313040 | A1 | 11/2013 | Cummings | |
| 2014/0324310 | A1 | 10/2014 | Kobayashi | |
| 2014/0332314 | A1 | 11/2014 | Carrillo | |
| 2015/0008073 | A1 | 1/2015 | Cummings | |
| 2015/0027808 | A1 | 1/2015 | Baillargeon et al. | |
| 2015/0144426 | A1 | 5/2015 | Hao | |
| 2015/0210115 | A1 | 7/2015 | David | |
| 2015/0217981 | A1 | 8/2015 | Baillargeon | |
| 2015/0368082 | A1 | 12/2015 | Davis | |
| 2016/0075543 | A1 | 3/2016 | Lombardo | |
| 2016/0221812 | A1 | 8/2016 | Puszkiewicz | |
| 2016/0264131 | A1 | 9/2016 | Chan | |
| 2016/0332856 | A1 | 11/2016 | Steedley | |
| 2017/0008534 | A1 | 1/2017 | Nakatsuka | |
| 2017/0021764 | A1 | 1/2017 | Adams | |
| 2017/0107090 | A1 | 4/2017 | Mondal | |
| 2017/0233232 | A1 | 8/2017 | Davis | |
| 2017/0241155 | A1 | 8/2017 | Johnson | |
| 2017/0255966 | A1 | 9/2017 | Khoury | |
| 2017/0316696 | A1 | 11/2017 | Bartel | |
| 2018/0022358 | A1 | 1/2018 | Fung | |
| 2018/0022405 | A1 | 1/2018 | Gecchelin | |
| 2018/0265336 | A1 * | 9/2018 | Xu | B66F 11/044 |
| 2019/0077646 | A1 | 3/2019 | Puszkiewicz et al. | |

FOREIGN PATENT DOCUMENTS

| | | | | |
|---|---|---|---|---|
| CN | 102259811 | | 11/2011 | |
| CN | 202030492 | | 11/2011 | |
| CN | 102275850 | | 12/2011 | |
| CN | 202379687 | | 8/2012 | |
| CN | 202379687 | U | 8/2012 | |
| CN | 203877860 | | 10/2014 | |
| CN | 204281238 | U | 4/2015 | |
| FR | 2 836 468 | | 8/2003 | |
| FR | 3 000 200 | | 12/2012 | |
| GB | 2457908 | A * | 9/2009 | B66F 11/04 |
| GB | 2472441 | A * | 2/2011 | B66F 11/044 |
| GB | 2481709 | | 1/2012 | |
| GB | 2495158 | | 4/2013 | |
| JP | 62-153098 | | 7/1987 | |
| JP | 63-142400 | | 9/1988 | |
| JP | 1-118987 | | 8/1989 | |
| JP | 1-285591 | | 11/1989 | |
| JP | H04-065299 | U | 6/1992 | |
| JP | 4-77600 | | 7/1992 | |
| JP | 4-116282 | | 10/1992 | |
| JP | 5-124800 | | 5/1993 | |
| JP | 05124800 | A * | 5/1993 | B66F 17/006 |
| JP | 7-49360 | | 5/1995 | |
| JP | 8-277099 | | 10/1996 | |
| JP | H08-277099 | A | 10/1996 | |
| JP | H09-040381 | A | 2/1997 | |
| JP | 2003-221195 | | 8/2003 | |
| JP | 2005-289348 | A | 10/2005 | |
| JP | 2007-43383 | | 2/2007 | |
| JP | 2011-63352 | | 3/2011 | |
| JP | 2013-010588 | | 1/2013 | |
| JP | 2013-10589 | | 1/2013 | |
| JP | 2013-52948 | | 3/2013 | |
| JP | 2013-545693 | | 12/2013 | |
| WO | WO 2009/037429 | | 3/2009 | |
| WO | WO 2011/015815 | | 2/2011 | |
| WO | WO 2012/001353 | | 1/2012 | |
| WO | WO 2012/088091 | | 6/2012 | |
| WO | WO 2014/206982 | | 12/2014 | |
| WO | WO-2016/123005 | | 8/2016 | |

OTHER PUBLICATIONS

Chinese Office Action dated Aug. 2, 2018 issued in Chinese Patent Application No. 2016800074163 and English Translation, 14 pp.

U.S. Office Action dated Dec. 3, 2018 issued in U.S. Appl. No. 14/950,845, 16 pp.

Chinese Office Action dated Mar. 15, 2019 issued in Chinese Office Action 201710220836.6 and English translation, 18 pp.

Japanese Office Action dated Sep. 8, 2020 issued in Japanese Patent Application No. 2018-179788 and English translation, 22 pp.

Chinese Office Action dated Aug. 2, 2018 issued in Chinese Patent Application No. 201710220836.6 and English translation, 19 pp.

* cited by examiner

OPTO-ELECTRIC SYSTEM OF ENHANCED OPERATOR CONTROL STATION PROTECTION

CROSS-REFERENCES TO RELATED APPLICATIONS

This application is a continuation of U.S. patent application Ser. No. 16/189,021, filed Nov. 13, 2018, which is a continuation of U.S. patent application Ser. No. 15/094,286, filed Apr. 8, 2016, now U.S. Pat. No. 10,124,999, which is a continuation-in-part (CIP) of U.S. patent application Ser. No. 13/885,720, filed May 16, 2013, now U.S. Pat. No. 9,586,799, which is the U.S. national phase of PCT International Application No. PCT/US2011/066122, filed Dec. 20, 2011, which designated the U.S. and claims priority to U.S. Provisional Patent Application No. 61/424,888, filed Dec. 20, 2010 and U.S. Provisional Patent Application No. 61/435,558, filed Jan. 24, 2011, the entire contents of each of which are hereby incorporated by reference in this application.

STATEMENT REGARDING FEDERALLY SPONSORED RESEARCH OR DEVELOPMENT (Not Applicable)

BACKGROUND

The invention relates to work platforms and, more particularly, to a work platform including provisions to enhance protection for an operator from sustained involuntary operation resulting in an impact with an obstruction or structure.

Lift vehicles including aerial work platforms, telehandlers such as rough terrain fork trucks with work platform attachments, and truck mounted aerial lifts are known and typically include an extendible boom, which may be positioned at different angles relative to the ground, and a work platform at an end of the extendible boom. On or adjacent the platform, there is typically provided a control console including various control elements that may be manipulated by the operator to control such functions as boom angle, boom extension, rotation of the boom and/or platform on a vertical axis, and where the lift vehicle is of the self-propelled type, there are also provided engine, steering and braking controls.

A safety hazard can occur in a lift vehicle including a work platform when an operator is positioned between the platform and a structure that may be located overhead or behind the operator, among other places. The platform may be maneuvered into a position where the operator is crushed between that structure and the platform, resulting in serious injury or death.

SUMMARY

It would be desirable for a platform to incorporate protective structure to enhance protection of the operator from continued involuntary operation of the machine upon impacting an obstruction or structure. The protecting structure can also serve as a physical barrier to enhance protection for the operator and/or cooperate with the drive/boom functions control system to cease or reverse movement of the platform. If cooperable with the operating components of the machine, it is also desirable to prevent inadvertent tripping of the protective structure.

In some embodiments, an opto-electric sensor based system provides enhanced protection against sustained operation for aerial work platforms. The sensor is designed to be clamped to the safety rail of the platform. The system incorporating an opto-electric sensor is an improvement over existing systems that utilize physical contact with a switch or the like for activation. In the previous systems, the operator must make physical contact with a switch in order to activate an enhanced operator protection system. The system according to the described embodiments resolves drawbacks of the existing system with respect to obstruction of visibility and sensitivity of the shear blocks to accidental shear that result in a service call.

In an exemplary embodiment, a personnel lift includes a vehicle chassis, a lifting assembly secured to the vehicle chassis, and a work platform attached to the lifting assembly. The work platform includes a floor structure, a safety rail coupled with the floor structure and defining a personnel work area, and a control panel area. A control box is disposed in the control panel area and includes an operator input implement. Driving components cooperable with the lifting assembly provide for lifting and lowering the work platform. A sensor is positioned adjacent the control panel area and includes a transmitter unit mounted to the safety rail on one side of the control box and a receiver unit mounted to the safety rail on an opposite side of the control box. The transmitter unit emits a light beam across the control panel area to the receiver unit. A control system communicating with the driving components, the control box, and the sensor controls operation of the driving components based on signals from the operator input implement and the sensor.

Relative to the floor structure, the sensor may be positioned above and in front of the control panel area. The control system may be programmed to shut down the driving components when the light beam from the transmitter unit may be not received by the receiver unit. The control system may be programmed to modify operating parameters of the driving components when the light beam from the transmitter unit is not received by the receiver unit.

In some embodiments, the sensor includes two receiver units that are positioned to receive the light beam from the transmitter unit. In this context, the control system may be programmed to prevent operation of the driving components when one or both of the receiver units do not detect the light beam. Additionally, the control system may be programmed to reverse a last operation by the driving components when one or both of the receiver units do not detect the light beam for a predetermined period of time, which may be at most one second.

The lift may include an override switch communicating with the control system to permit operation of the driving components at creep speed despite that the receiver unit does not detect the light beam.

In some embodiments, the sensor may include a first housing in which the transmitter unit is disposed and a second housing in which the receiver unit is disposed, where the first and second housings include respective clamps for attaching the housings to the safety rail. A window opening may be provided in each of the first and second housings and a window may be disposed in each of the window openings, where the windows are positioned adjacent the transmitter unit and the receiver unit, respectively. The windows may protrude from a surface of the housings.

The lift may additionally include a warning system positioned adjacent the control panel area on an operator side of the sensor. The warning system may include a warning transmitter unit mounted on the one side of the control box, a warning receiver unit mounted on the opposite side of the control box, and an indicator lamp. The warning transmitter unit emits a second light beam across the control panel area to the warning receiver unit. In this context, the control system may be programmed to change the indicator lamp when the second light beam from the warning transmitter unit is not received by the warning receiver unit.

In another exemplary embodiment, a system for protecting an operator on an aerial work platform from a crushing hazard includes a sensor positionable adjacent the control panel area, where the sensor includes a first transmitter unit positioned on one side of the control panel area and a first receiver unit positioned on an opposite side of the control panel area. The first transmitter unit emits a light beam across the control panel area to the first receiver unit. A control system may communicate with the sensor and cooperate with driving components of the aerial work platform, where the control system may be programmed to control operation of the driving components based on signals from the sensor.

In yet another exemplary embodiment, a personnel lift includes a vehicle chassis, a lifting assembly secured to the vehicle chassis, and a work platform attached to the lifting assembly. A control box is disposed in the control panel area and includes an operator input implement. Driving components cooperable with the lifting assembly lift and lower the work platform. An opto-electric sensor positioned adjacent the control panel area is configured to detect an object entering the control panel area. A control system communicating with the driving components, the control box, and the sensor controls operation of the driving components based on signals from the operator input implement and the sensor.

BRIEF DESCRIPTION OF THE DRAWINGS

These and other aspects and advantages will be described in detail with reference to the accompanying drawings, in which.

DETAILED DESCRIPTION

Figure 1:
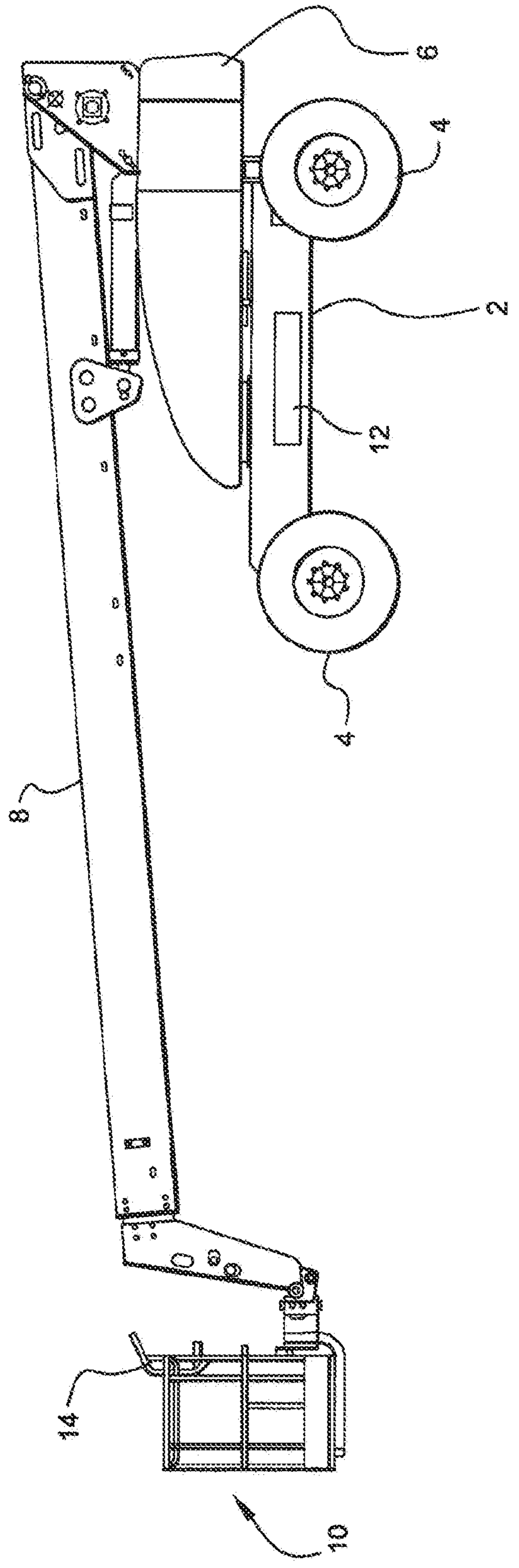
FIG. 1 illustrates an exemplary lift vehicle.

FIG. 1 illustrates an exemplary typical aerial lift vehicle including a vehicle chassis 2 supported on vehicle wheels 4. A turntable and counterweight 6 are secured for rotation on the chassis 2, and an extendible boom assembly is pivotably attached at one end to the turntable 6. An aerial work platform 10 is attached at an opposite end of the extendible boom 8. The illustrated lift vehicle is of the self-propelled type and thus also includes a driving/control system (illustrated schematically in FIG. 1 at 12) and a control console 14 on the platform 10 with various control elements that may be manipulated by the operator to control such functions as boom angle, boom extension, rotation of the boom and/or platform on a vertical axis, and engine, steering and braking controls, etc.

Figure 2:
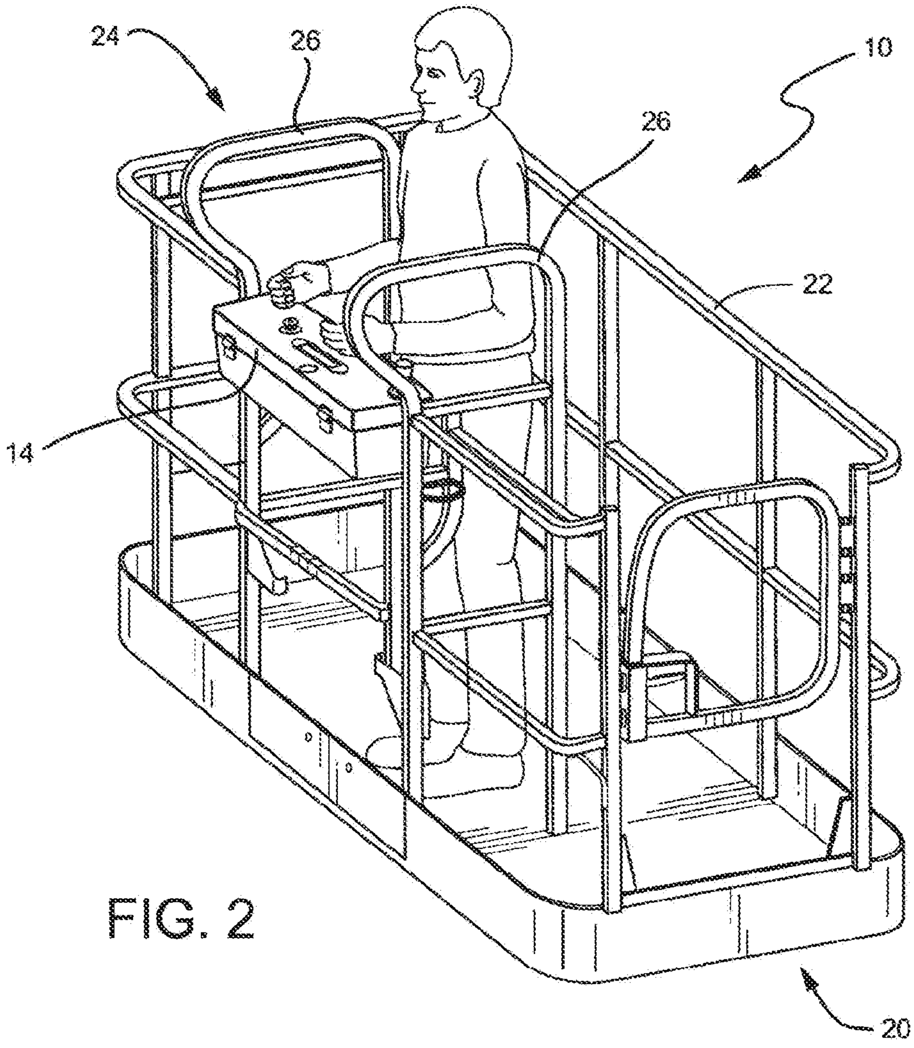
FIGS. 2-3 show a work platform including a protection envelope of a first embodiment.
Figure 3:
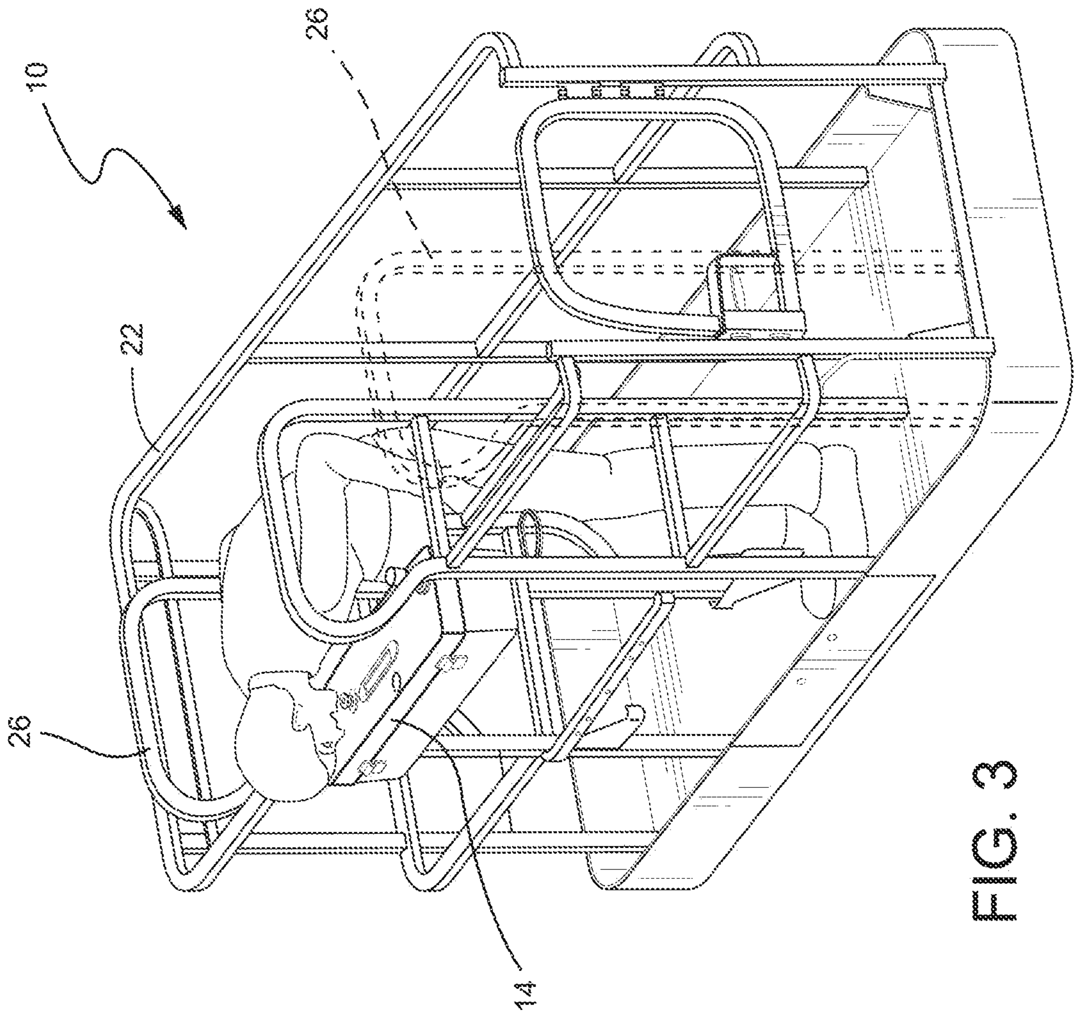

FIGS. 2 and 3 show an exemplary work platform 10 including a protection envelope according to a first embodiment of the invention. The platform 10 includes a floor structure 20, a safety rail 22 coupled with the floor structure 20 and defining a personnel work area, and a control panel area 24 in which the control panel 14 is mounted. The protection envelope surrounds the control panel area 24 and serves to enhance protection for the operator from an obstruction or structure that may constitute a crushing hazard.

As shown in FIGS. 2 and 3, the protection envelope may include protection bars 26 on either side of the control panel area 24 extending above the safety rail 22. The safety rail 22 includes side sections (the longer sections in FIGS. 2 and 3) and end sections (the shorter sections in FIGS. 2 and 3). The control panel area 24 may be positioned within one of the side sections. In one construction, the protection bars 26 are disposed intermediately within the one of the side sections adjacent the control panel area 24. In an alternative construction, the protection bars 26 may be disposed in alignment with the end sections of the safety rail 22 (as shown in dashed line in FIG. 3). Preferably, the protection bars 26 extend above the safety rail 22 by an amount sufficient to accommodate an anteroposterior diameter of an adult human (i.e., a distance between a person's front and back). In this manner, if an obstacle is encountered that could result in crushing the operator between the structure and the control panel 14, the operator will be protected from injury by the protection bars 26 with sufficient space between the control panel 14 and a top of the protection bars 26 to accommodate the operator's torso. FIG. 3 shows the user in a "safe" position where an encountered structure is prevented from crushing the operator by the protection bars 26.

Figure 4:
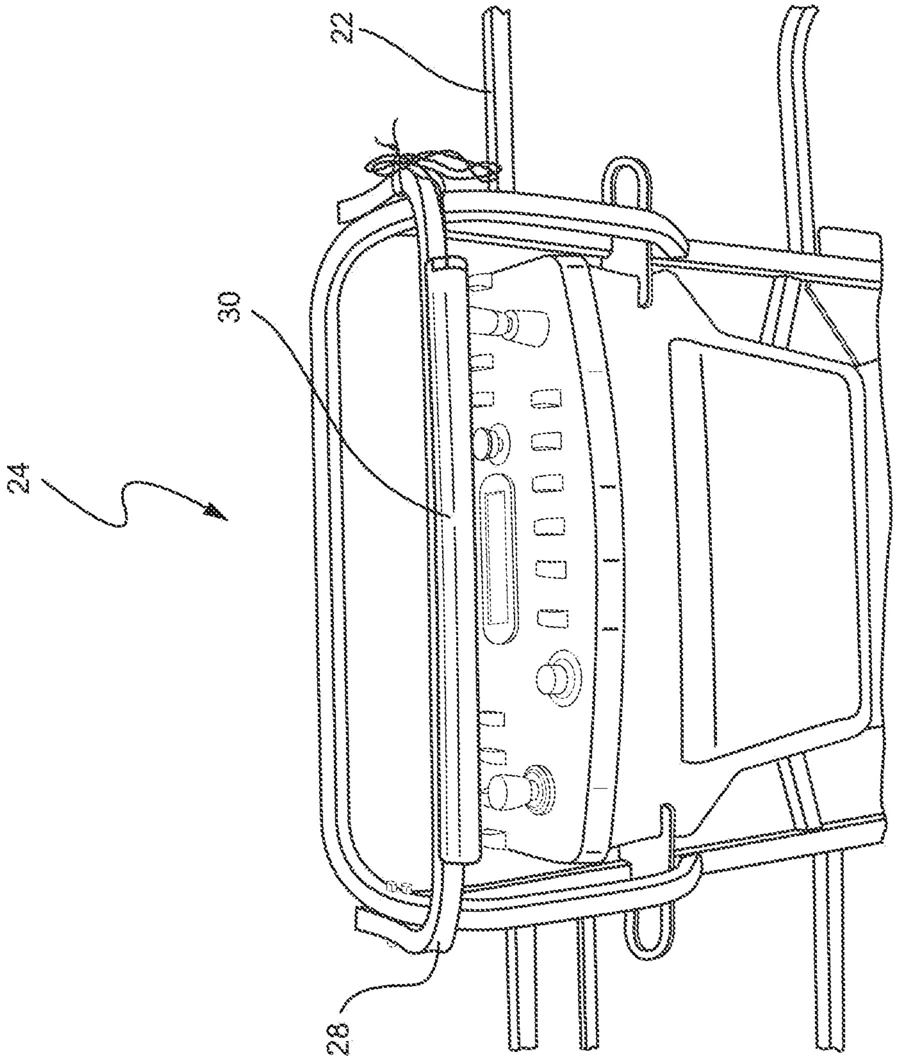
FIG. 4 shows a control panel area and a protective envelope including a platform switch.

An alternative protection envelope is shown in FIG. 4. In this embodiment, the protection envelope includes a switch bar 28 secured in the control panel area 24. A platform switch 30 is attached to the switch bar 28 and includes sensors for detecting the application of a force, such as by an operator being pressed into the platform switch by an obstruction or structure. The platform switch 30 is configured to trip upon an application of a predetermined force. The force causing the platform switch 30 to be tripped may be applied to the platform switch 30 itself or to the switch bar 28 or to both. It has been discovered that inadvertent tripping can be avoided if the predetermined force is about 40-50 lbs over a 6" sensor (i.e., about 6.5-8.5 lbs/in). As shown, the switch bar 28 and the platform switch 30 are positioned between the personnel work area and the safety rail 22. Relative to the floor structure, the switch bar 28 and the platform switch 30 are positioned above and in front of the control panel area 24. Based on an ergonomic study, it was discovered that the switch bar 28 and platform switch 30 should be positioned about 50" above the platform floor.

Figure 5:
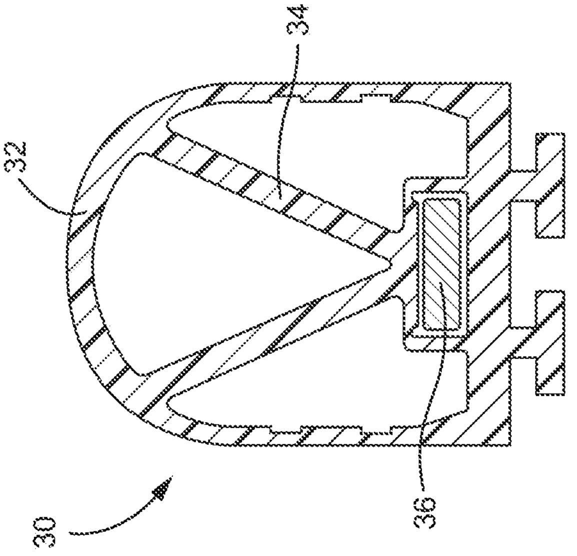
FIG. 5 is a cross-sectional view of the platform switch.

Although any suitable construction of the platform switch 30 could be used, a cross section of an exemplary switch 30 is shown in FIG. 5. The switch 30 includes a switch housing 32 with internal ribs 34 connected between the switch housing and a pressure switch 36. Sensitivity can be adjusted by selecting a different rating pressure switch 36 and/or by adjusting the number, shape and stiffness of the ribs 34. The switch bar 28 and platform switch 30 also serve as a handle bar that an operator can grab in an emergency.

Figure 6:
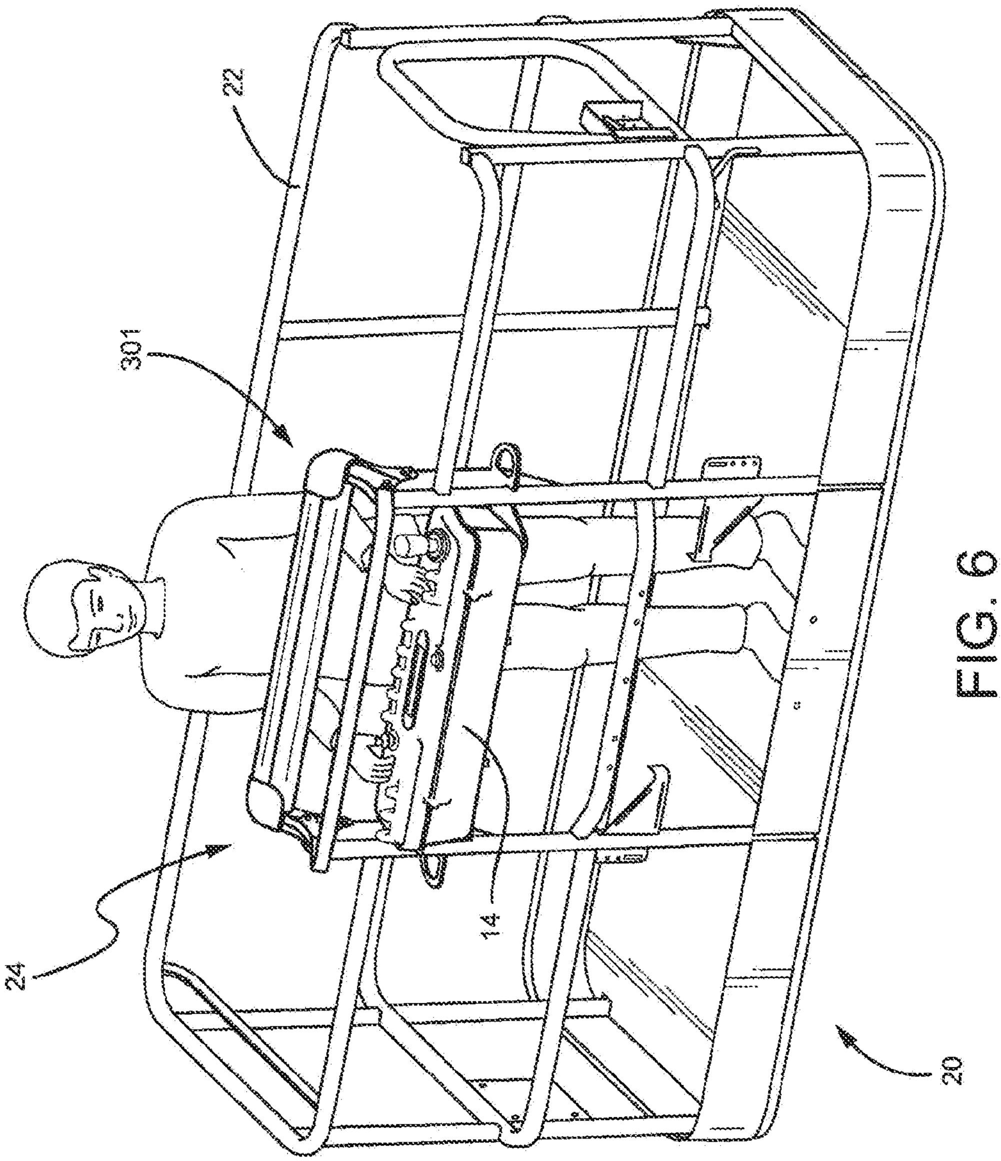
FIGS. 6-7 show an alternative design of the protection envelope including the platform switch.
Figure 7:
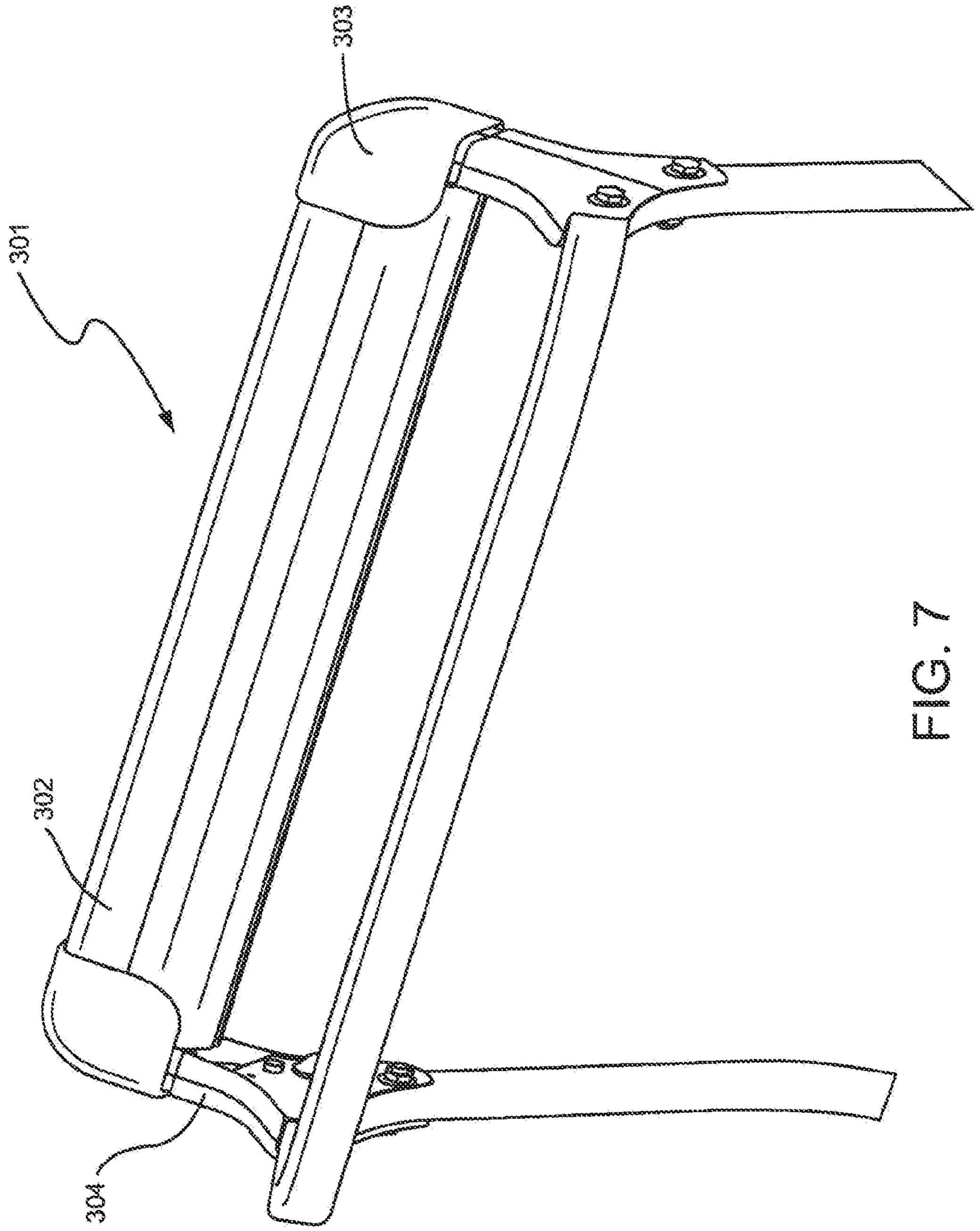

An alternative platform switch assembly 301 is shown in FIGS. 6 and 7. The switch assembly 301 includes a platform switch 302 with injection molded end caps 303 and die cast mounting brackets 304. The platform switch 302 operates in a similar manner to the switch 30 shown in FIGS. 4 and 5. An exemplary suitable switch for the platform switch is available from Tapeswitch Corporation of Farmingdale, NY.

Figure 8:
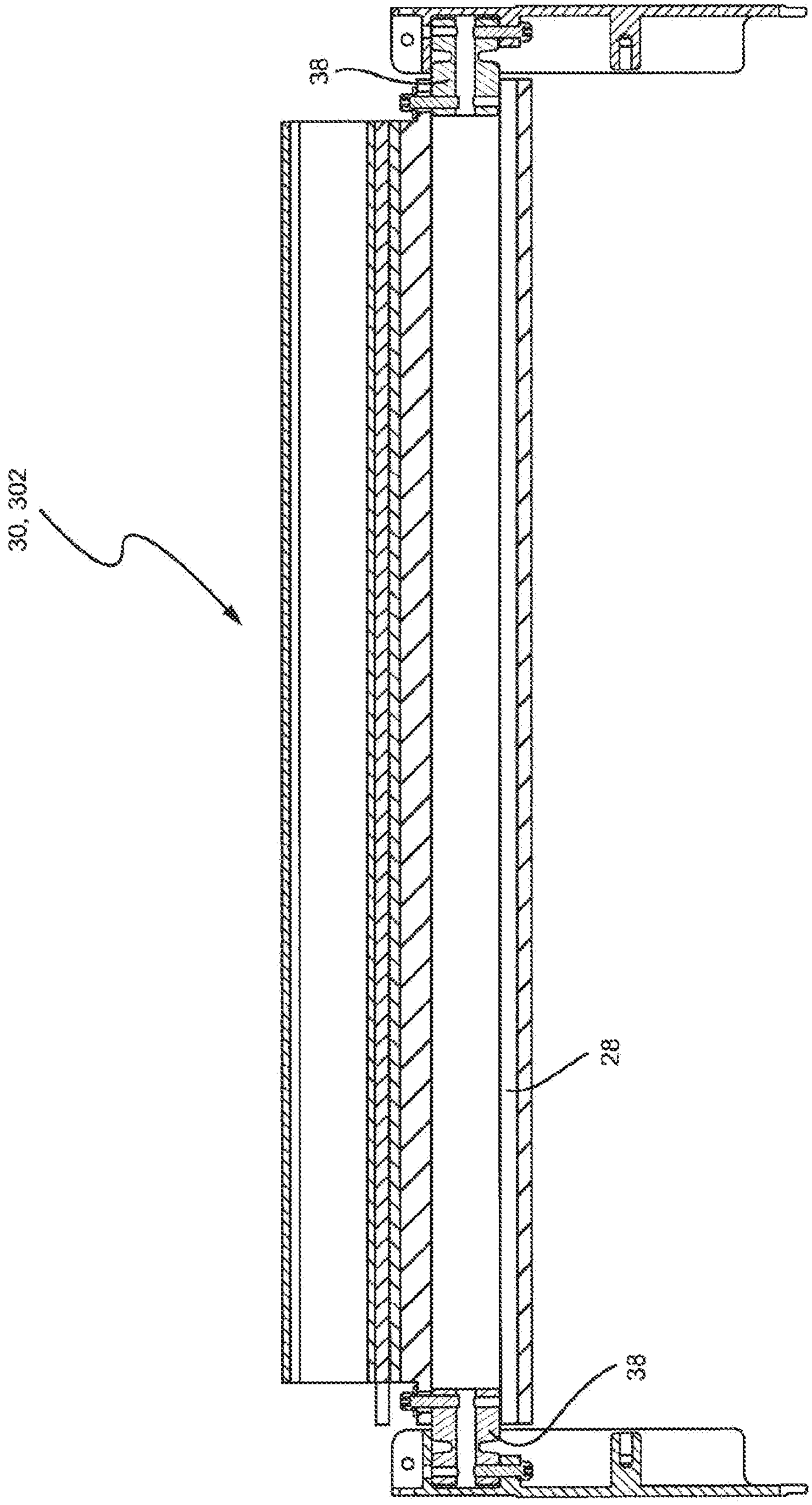
FIG. 8 shows the platform switch connected with shear elements.

With reference to FIG. 8, the platform switch 30, 302 and switch bar 28 may be secured to the control panel area 24 via a shear element 38. The shear element 38 includes a reduced diameter section as shown that is sized to fail upon an application of a predetermined force. With this construction, in the event that the machine momentum or the like carries the platform beyond a stop position after the platform switch is tripped, the shear elements 38 will fail/break to give the operator additional room to avoid entrapment. The predetermined force at which the shear element 38 would fail is higher than the force required to trip the platform switch 30, 301. In one construction, nylon may be used as the material for the shear element 38, since nylon has low relative elongation to plastic. Of course, other materials may be suitable.

In use, the driving components of the vehicle that are cooperable with the lifting assembly for lifting and lowering the work platform are controlled by an operator input implement on the control panel 14 and by the driving/control system 12 communicating with the driving components and the control panel 14. The control system 12 also receives a signal from the platform switch 30, 302 and controls operation of the driving components based on signals from the operator input implement and the platform switch 30, 302. At a minimum, the control system 12 is programmed to shut down driving components when the platform switch 30, 302 is tripped. Alternatively, the control system 12 may reverse the last operation when the platform switch 30, 302 is tripped.

If function cutout is selected, when the platform switch is tripped, the active function will be stopped immediately, and all non-active functions shall not be activated. If a reversal function is selected, when the platform sensor is tripped during operation, the operation required RPM target is maintained, and the active function only when the trip occurred is reversed until the reversal function is stopped. A ground horn and a platform horn can be activated when the reversal function is active. After the reversal function is completed, engine RPM is set to low, and all functions are disabled until the functions are re-engaged with the foot switch and operator controls. The system may include a platform switch override button that is used to override the function cut out initiated by the platform switch. If the override button is pressed and held, it enables the hydraulic functions if the foot switch and controls are re-engaged sequentially. In this event, function speed is set in creep mode speed automatically. The control system 12 is programmed to avoid the cut out feature being disabled before the platform switch is tripped regardless of whether the override button is pressed or released. This assures that the cut out feature will still be available if the override button is stuck or manipulated into an always-closed position.

The reversal function is implemented for various operating parameters of the machine. For vehicle drive, if drive orientation shows that the boom is between the two rear wheels, reversal is allowed only when the drive backward is active and the platform switch is tripped. If a drive forward request is received when the platform switch is tripped, it is treated as a bump or obstacle in the road and will not trigger the reversal function. If the drive orientation shows that the boom is not in line with the rear wheels, then both drive forward and drive backward may trigger the reversal function. Additional operating parameters that are implemented with the reversal function include main lift, tower lift, main telescope (e.g., telescope out only), and swing.

Reversal function terminates based on the platform switch signal, footswitch signal and time parameters that are set for different functions, respectively. If the platform switch changes from trip status to non-trip status before the maximum reversal time is elapsed, then the reversal function will be stopped; otherwise, the reversal function is active until the maximum reversal time is elapsed.

Disengaging the footswitch also terminates the reversal function at any time.

If an operator is trapped on the platform, ground control can be accessed from the ground via a switch. In the ground control mode, if the platform switch is engaged, boom operation is allowed to operate in creep speed. If the platform switch changes status from engaged to disengaged, then operation is maintained in creep speed unless the ground enable and function control switch is re-engaged.

Figure 9:
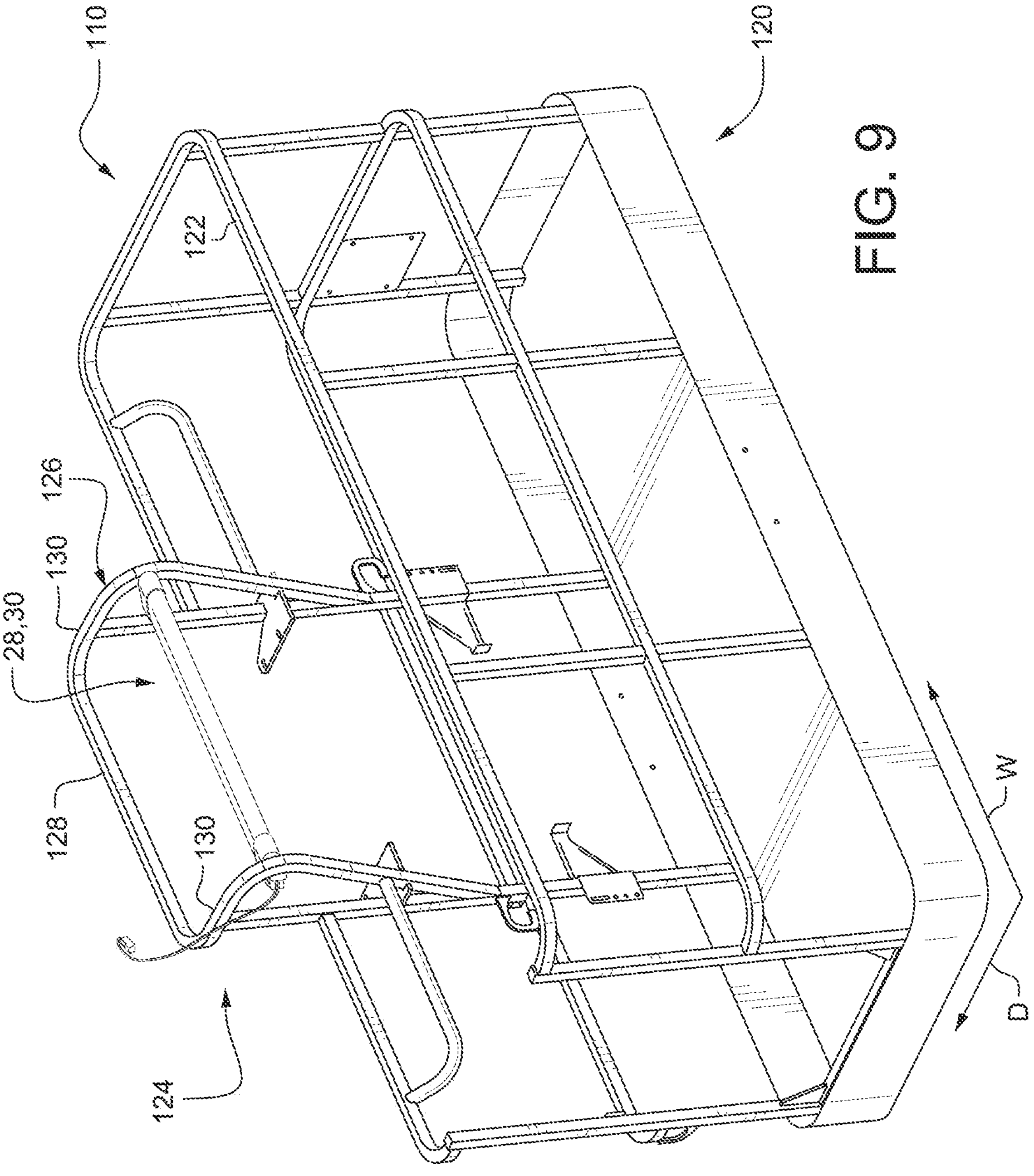
FIG. 9 is a perspective view showing an alternative platform design including the switch bar and platform switch.
Figure 10:
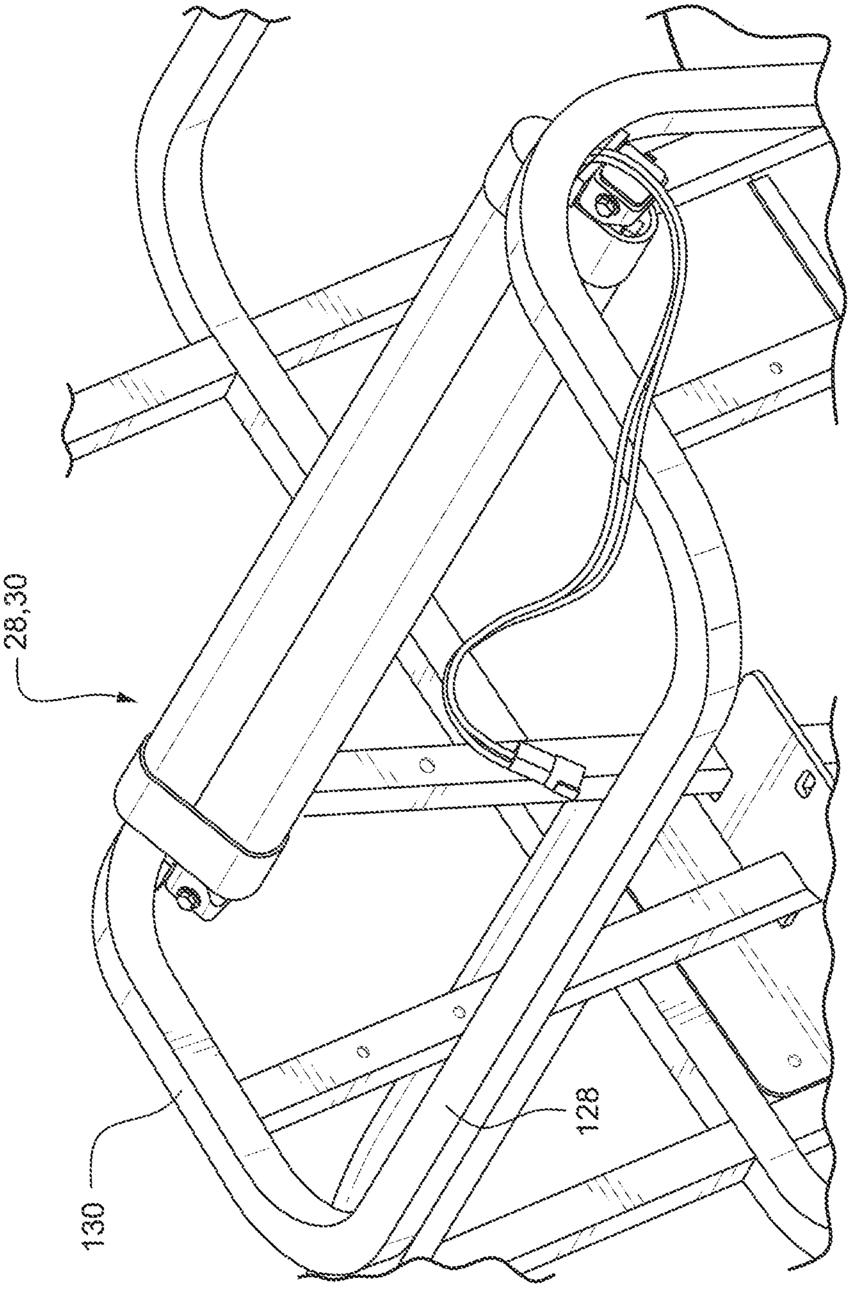
FIG. 10 is a detailed view of the switch bar and platform switch secured to the platform of FIG. 9.
Figure 11:
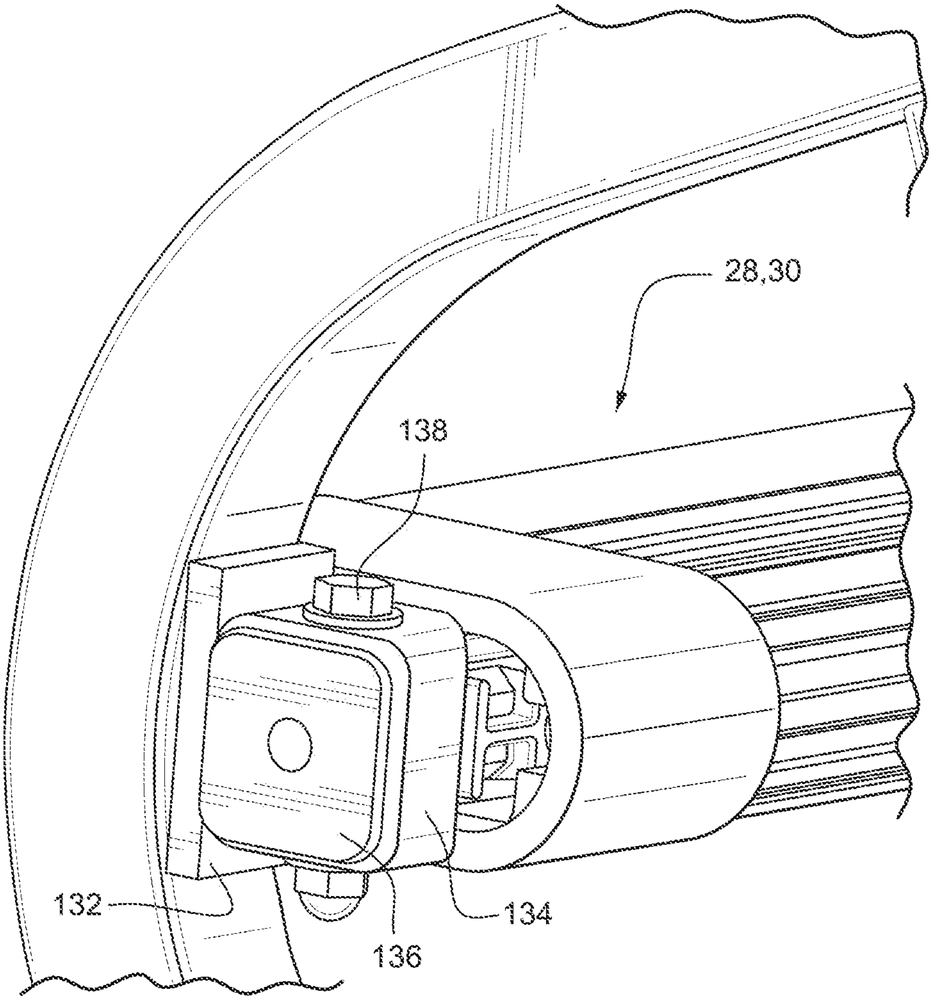
FIG. 11 is a close-up view of the switch bar secured to a sensor support bar of the platform shown in FIG. 9.

FIGS. 9-11 show an alternative work platform 110 including a floor structure 120, a safety rail 122 coupled with the floor structure 120, and a control panel area 124 to which the control panel (not shown) is mounted. The switch bar 28 and platform switch 30 are secured in the control panel area 124. The control panel area 124 includes a sensor support bar 126 having a top crossbar 128 extending along a width dimension (W in FIG. 9) and sidebars 130 extending substantially perpendicularly from the top crossbar 128. The sidebars 130 define a width of the control panel area 124.

The sensor support bar 126 is preferably bent from a single piece of material, although multiple pieces can be attached to one another in the arrangement shown. Each of the sidebars 130 may include an upper section extending from the top crossbar inward in a depth dimension (D in FIG. 9) to a bent section. A lower section preferably extends from the bent section outward in the depth dimension to the safety rail 122. With continued reference to FIG. 9, the upper section of the sidebars 130 may be angled downwardly from the top crossbar 128 to the bent section. The lower section may extend at an angle from the bent section to the safety rail 122. As shown, the lower section may extend in a substantially straight line from the bent section to the safety rail. In the arrangement shown, the safety rail 122 extends above the floor structure 120 to a rail height, where the lower sections of the sidebars 130 connect to the safety rail 122 at a position about halfway between the floor structure 120 and the rail height. AS also shown in FIG. 9, the top crossbar 128 is preferably positioned above the rail height.

The switch bar 28 and the platform switch 30 may be connected to the sensor support bar 126 at the bent sections of the sidebars 130 as shown. The platform switch is positioned inward in the depth dimension D of the floor structure such that an operator in the control panel area is closer to the platform switch 30 than to the safety rail 122. Preferably, the switch bar and platform switch are under-mounted on the sensor support bar 126 relative to an operator standing on the floor structure 120. That is, as shown in FIGS. 10 and 11, the switch bar 28 is preferably coupled to an outside surface of the sensor support bar 126 on an opposite side of the sensor support bar 126 relative to a position of an operator standing on the platform. The under-mounted configuration results in a simpler assembly (e.g., without brackets 304) and improved ergonomics.

FIG. 11 is a close-up view of the switch bar 30 secured to the sensor support bar 126. In a preferred construction, a block 132 is fixed (e.g., by welding) to the sensor support bar 126, and a block holder 134 is fixed (e.g., by welding) to the block 132. The block holder 134 receives a shear block 136 of the switch bar 30 and is secured by a fastener 138 such as a bolt or the like. A similar bolt (not shown) secures the switch bar 30 to the shear block 136.

Figure 12:
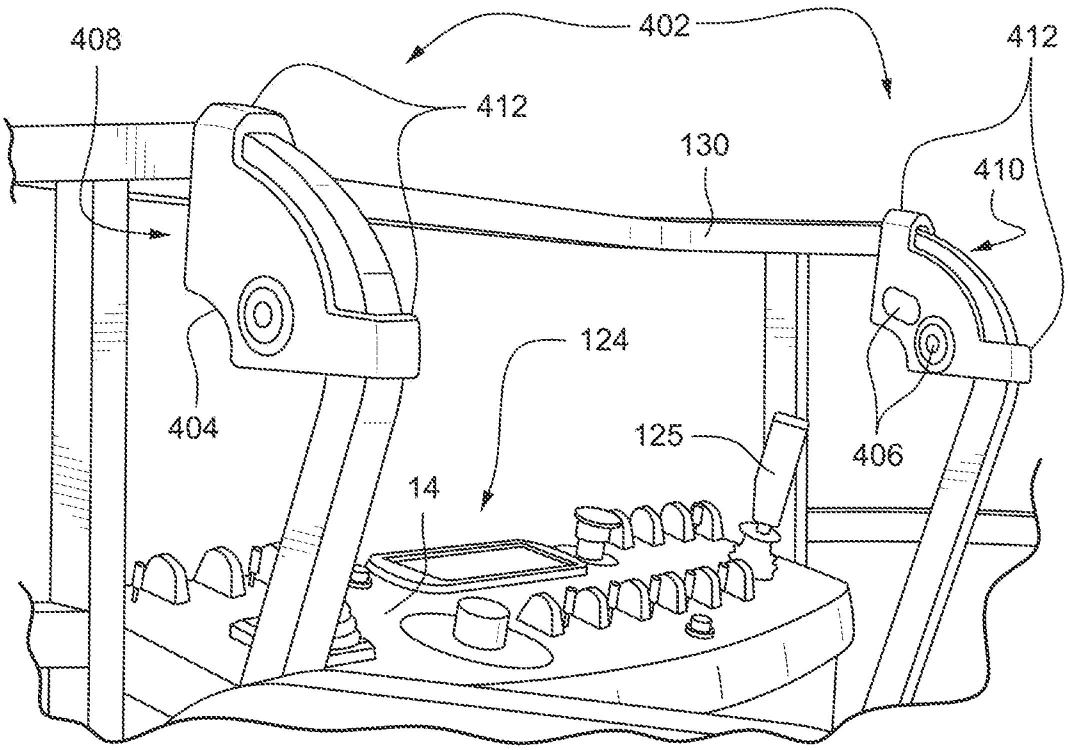
FIGS. 12 and 13 are perspective views of a work platform incorporating an opto-electric sensor system.
Figure 13:
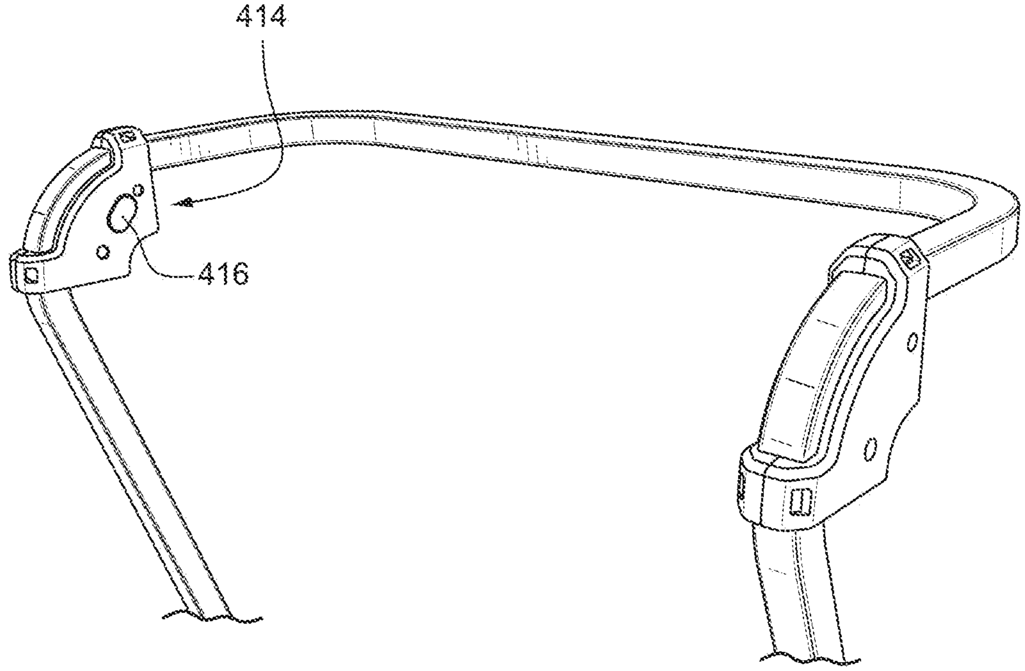
Figure 14:
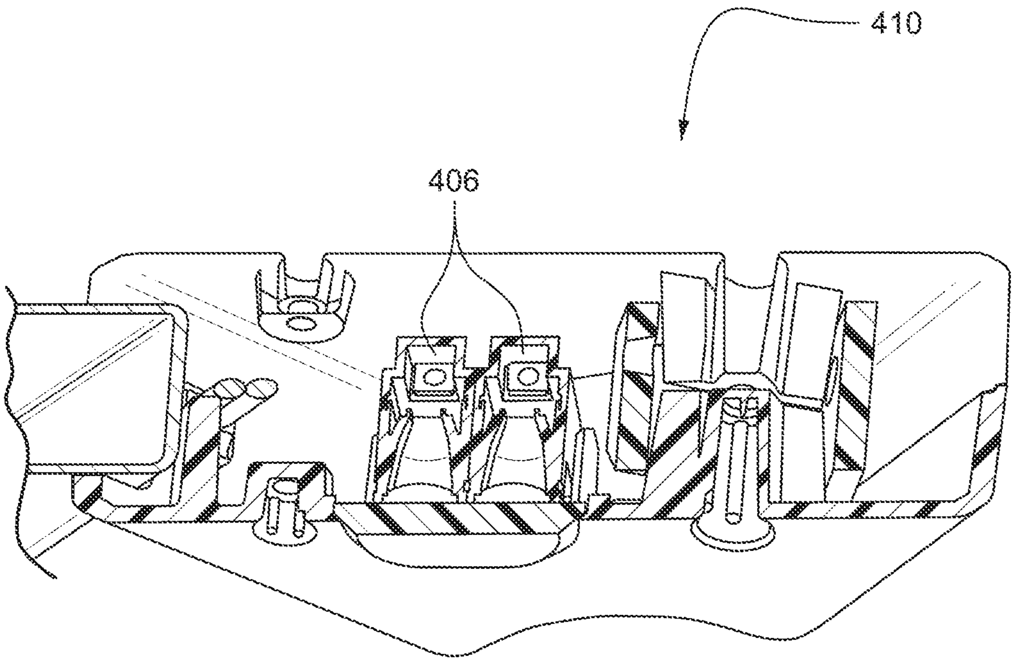
FIG. 14 is a section view of a sensor housing.

FIGS. 12-14 show another alternative embodiment, which utilizes an opto-electric sensor for detecting an object such as an operator entering the control panel area 124. Like previous embodiments, the personnel lift includes a vehicle chassis, a lifting assembly secured to the vehicle chassis, and a work platform attached to the lifting assembly. The work platform includes a floor structure, a safety rail 122 coupled with the floor structure and defining a personnel work area, and a control panel area. See, for example, FIGS. 1-3 and 9. A control panel or control box 14 is disposed in the control panel area 124 and includes one or more operator input elements 125. Like previously described embodiments, driving components are cooperable with the lifting assembly for lifting and lowering the work platform.

With reference to FIGS. 12 and 13, a sensor 402 is positioned adjacent the control panel area 124. Relative to the floor structure 20 (see FIGS. 2, 3 and 9), the sensor 402 is positioned above and in front of the control panel area. The sensor 402 includes a transmitter unit 404 mounted to a sidebar 130 of the safety rail 122 on one side of the control box 14 and a receiver unit 406 mounted to a sidebar 130 of the safety rail 122 on an opposite side of the control box 14. The transmitter unit 404 emits a light beam across the control panel area 124 to the receiver unit 406. The control system 12 (shown schematically in FIG. 1) communicates with the driving components, the control box 14 and the sensor 402. The control system 12 controls operation of the driving components based on signals from the operator input element(s) 125 and the sensor 402.

In some embodiments, the receiver unit 406 is actually two receiver units that are both positioned to receive the light beam emitted from the transmitter unit 404 (see FIG. 14). In use, if the light beam from the transmitter unit 404 is detected by the receiver unit 406 (or both receiver units in the embodiment where two receiver units 406 are provided), the machine is allowed to operate normally. If the receiver unit 406 (or either or both receiver units 406 in the embodiment utilizing two receiver units) does not detect the transmitter beam (such as if the operator leans over the platform control box 14), the control system is programmed to stop machine functions, and further operation from the platform is prevented. Additionally, the control system may be programmed to reverse a last operation by the driving components when one or both of the receiver units 406 do not detect the light beam for a predetermined period of time, which at most may be one second or less.

Like previously described embodiments, the system may include an override switch on the platform control box 14 to allow function use at reduced (creep) speed. Normal operation of the machine is prevented until the receiver unit 406 (or both receiver units 406) detect the transmitter beam.

With continued reference to FIGS. 12 and 13, the sensor 402 may include a housing 408 in which the transmitter unit 404 is disposed and a housing 410 in which the one or more receiver units 406 are disposed (see also FIG. 14). The housings include respective clamps 412 for securing the housings to the sidebars 130 of the safety rail 122. In some embodiments, the housings include a window opening 414 and a window 416 disposed in each of the window openings 414. The windows 416 are positioned adjacent the transmitter unit 404 and the receiver unit(s) 406, respectively. In some embodiments, the windows 416 protrude outward of the housing surface to facilitate cleaning (e.g., scraping paint, removing dirt, concrete spray, etc.).

Figure 15:
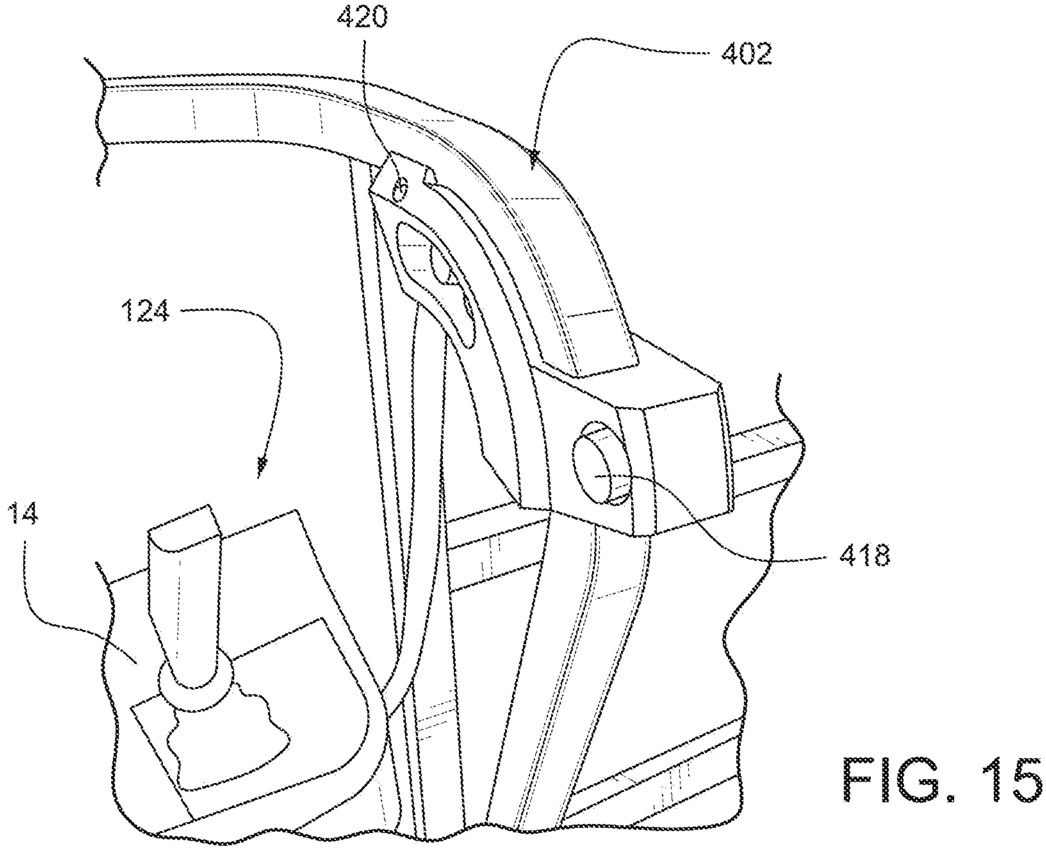
FIG. 15 is a perspective view of the opto-electric sensor system incorporating an extra transmitter/receiver pair.

FIG. 15 shows a modified sensor system incorporating an extra transmitter/receiver pair 418 as part of a warning or teaching system. That is, the extra transmitter/receiver pair 418 communicates the status of the system to the operator and teaches the operator of the location in which the sensor is active. The additional transmitter/receiver pair 418 is positioned adjacent the control panel area 124 on an operator side of the sensor 402. Specifically, the transmitter/receiver pair 418 includes a warning transmitter unit mounted on one side of the control box 14, a warning receiver unit mounted on the opposite side of the control box 14, and an indicator lamp 420. The warning transmitter unit emits a second light beam across the control panel area 124 to the warning receiver unit, and the control system is programmed to change the indicator lamp 420 when the second light beam from the warning transmitter unit is not received by the warning receiver unit. When the warning beam is interrupted, the indicator lamp 420 (or set of lamps) is changed, either turned off or changed from one color to another such as green to red. The indicator light or lights provide the operator with information that the system is ready and functioning and help the operator to develop proper habits, e.g., teaching the operator to remain in the proper position relative to the control box to facilitate smooth and uninterrupted operation of the machine.

In some embodiments, when power is applied to the machine control system, the control system may perform a diagnostic check of the receiver and transmitter system. The control system applies power in a predetermined orderly way to the receiver unit(s) and transmitter unit(s). The output values of the receiver units are evaluated by the control system for each powered state in order to detect faults with the components and/or wiring. For a system with two receivers and one transmitter, for example, the possible states are:

| R1 | R2 | T1 |
|---|---|---|
| OFF | OFF | OFF |
| OFF | ON | OFF |
| ON | ON | OFF |
| ON | OFF | OFF |
| ON | OFF | ON |
| OFF | OFF | ON |
| OFF | ON | ON |
| ON | ON | ON |

Figure 16:
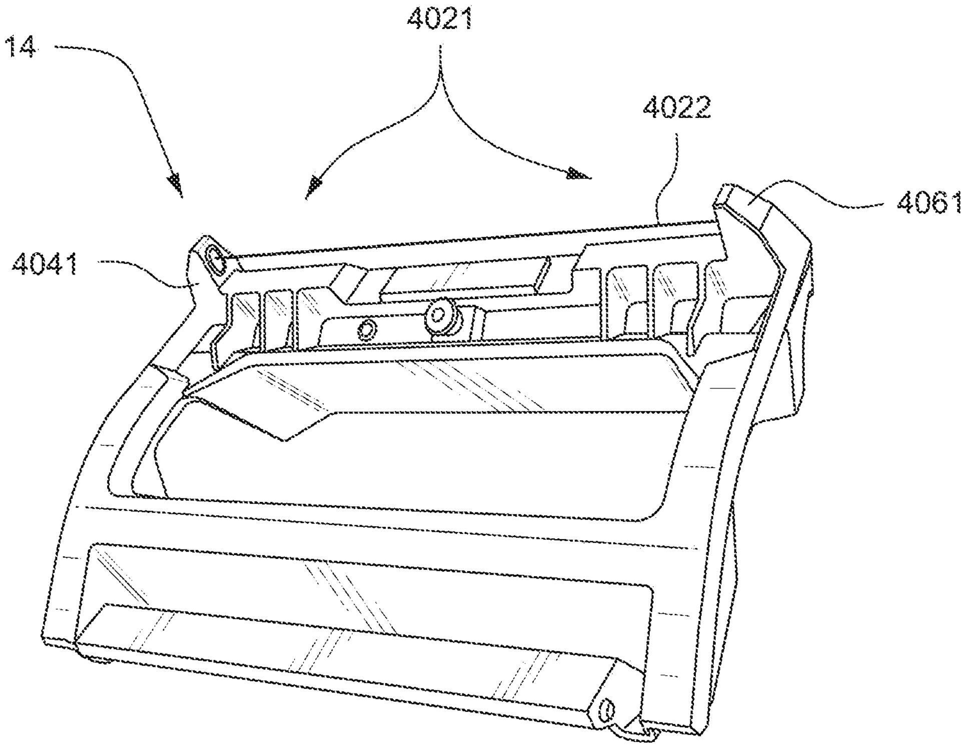
FIG. 16 shows an alternative embodiment with the sensors integrated with the platform control box.

In some embodiments, the sensor may be integrated with the platform control box 14 as shown in FIG. 16. As shown, the sensor 4021 is positioned above and in front of the control panel area and is integrated with the control box 14. The sensor 4021 includes a transmitter unit 4041 on one side of the control box 14 and a receiver unit 4061 on an opposite side of the control box 14. The transmitter unit 4041 emits a light beam 4022 across the control panel area to the receiver unit 4061. The remaining operation is the same as that in the previously described embodiments.

The sensors are preferably industrial photoelectric "light barrier" type sensors, where light and/or reference to a "light beam" is understood to cover a wide range of wavelengths—visible, infrared, laser, etc. The system may utilize receiver units with two complementary outputs. The complementary outputs are monitored in order to detect possible faults in components and wiring. The system may include a dedicated control module for operation and control of the transmitter, receiver and status lights (if any) including a machine platform control module interface. The dedicated control module may also perform diagnostics on the transmitter unit and the receiver unit(s). The sensor may include two discrete receiver units to provide redundancy. The sensor may include two discrete transmitter units and two discrete receiver units. Still further, the sensor may include a single transmitter unit and two discrete receiver units.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A work platform comprising:
- a floor structure defining an interior space;
- a safety rail coupled with the floor structure and including a first sidebar and a second sidebar laterally spaced from the first sidebar;
- a control panel supported on a portion of the safety rail;
- a control panel area disposed at least partially surrounding the control panel; and
- a protection device including an optical transmitter that emits a beam to an optical receiver, wherein the optical transmitter is disposed in a first housing, the first housing is coupled to the first sidebar and the optical receiver is disposed in a second housing, the second housing is coupled to the second sidebar so that the beam extends above the control panel and across an interior-facing side of the control panel area;
- wherein the first housing is coupled to a curved portion of the first sidebar and the second housing is coupled to a curved portion of the second sidebar, wherein the curved portion of the first sidebar defines a first bend between a first-end portion and a second-end portion of the first housing and the curved portion of the second sidebar defines a second bend between a first-end portion and a second-end portion of the second housing.

2. A work platform according to claim 1, wherein the control panel area comprises a top crossbar extending along a width dimension of the control panel area and the first sidebar and the second sidebar extend substantially perpendicularly from opposite ends of the top crossbar.

3. A work platform according to claim 2, wherein the two sidebars are integral with the top crossbar.

4. A work platform according to claim 1, wherein the optical transmitter is an infrared transmitter and the optical receiver is an infrared receiver.

5. A work platform according to claim 1, wherein the first housing and the second housing comprise respective clamps that secure the first housing and the second housing to the control panel area.

6. A work platform according to claim 1, wherein the first housing is directly coupled to the curved portion of the first sidebar and the second housing is directly coupled to the curved portion of the second sidebar.

7. A work platform according to claim 1, wherein the first-end portion of the first housing is at a first end of the first bend and the second-end portion of the first housing is at a second end of the first bend, the first end and the second end of the first bend being at different heights relative to the floor structure.

8. A personnel lift comprising:
- a vehicle chassis;
- a lifting assembly secured to the vehicle chassis;
- a work platform attached to the lifting assembly, the work platform including:
  - a floor structure,
  - a safety rail coupled with the floor structure and including a first sidebar and a second sidebar laterally spaced from the first sidebar,
  - a control panel supported on a portion of the safety rail,
  - a control panel area disposed at least partially surrounding the control panel, and
  - a protection device including an optical transmitter that emits a beam to an optical receiver, wherein the optical transmitter is disposed in a first housing that is coupled to a curved portion of the first sidebar so that the curved portion of the first sidebar is between a first-end portion and a second-end portion of the first housing, and wherein the optical receiver is disposed in a second housing that is coupled to a curved portion the second sidebar so that the curved portion of the second sidebar is between a first-end portion and a second-end portion of the second housing
- a control box disposed in the control panel area, the control box including an operator input implement;
- driving components coupled to the lifting assembly for lifting and lowering the work platform; and
- a controller in communication with the driving components, the control box, and the protection device, the controller configured to:
  - allow operation of the driving components when the optical receiver detects the beam;
  - stop operation of the driving components when the beam is blocked from reaching the optical receiver; and
  - reverse a last operation of the driving components after the optical receiver does not detect the beam for a predetermined period of time.

9. A personnel lift according to claim 8, wherein the control panel area comprises a top crossbar extending along a width dimension of the control panel area and two sidebars extending substantially perpendicularly from opposite ends of the top crossbar.

10. A personnel lift according to claim 9, wherein the protection device is coupled with the two sidebars.

11. A personnel lift according to claim 9, wherein the two sidebars are integral with the top crossbar.

12. A personnel lift according to claim 9, wherein the optical transmitter is coupled to one of the two sidebars and the optical receiver is coupled to another of the two sidebars so that the beam extends above the control panel and across an interior-facing side of the control panel area.

13. A personnel lift according to claim 8, wherein the optical transmitter is an infrared transmitter and the optical receiver is an infrared receiver.

14. A personnel lift according to claim 8, wherein the protection device is positioned above and in front of the control panel area relative to the floor structure.

15. A personnel lift according to claim 8, further comprising an override switch on the control box that is configured to allow function use at a speed lower than normal.

16. A personnel lift according to claim 8, wherein a first-end portion of the first housing is arranged at a different height relative to the floor structure than a second-end portion of the first housing, and a first-end portion of the second housing is arranged at a different height relative to the floor structure than a second-end portion of the second housing.

17. A personnel lift according to claim 8, wherein the first housing is directly coupled to the curved portion of the first sidebar and the second housing is directly coupled to the curved portion of the second sidebar.

* * * * *